June 1, 1954　　C. M. ASHLEY　　2,679,733
ABSORPTION REFRIGERATION SYSTEM, INCLUDING DILUTION MEANS
Filed Aug. 3, 1951

INVENTOR.
Carlyle M Ashley
BY
atty.

Patented June 1, 1954

2,679,733

UNITED STATES PATENT OFFICE 2,679,733

ABSORPTION REFRIGERATION SYSTEM, INCLUDING DILUTION MEANS

Carlyle M. Ashley, Fayetteville, N. Y., assignor to Carrier Corporation, Syracuse, N. Y., a corporation of Delaware Application August 3, 1951, Serial No. 240,185

6 Claims. (Cl. 62—119)

This invention relates to absorption refrigeration systems and more particularly to an absorption refrigeration system including means for withdrawing refrigerant from the system during initial operation and for returning the withdrawn refrigerant to the system upon shut-down to dilute the solution employed in the system.

The chief object of the present invention is to provide an absorption refrigeration system including means for diluting solution of the system when operation of the system is discontinued for any reason thereby preventing crystallization or solidification of the solution during such inactive period.

An object of the invention is to provide an absorption refrigeration system including a dilution tank which receives refrigerant vapor from the condenser, condenses the same during operation of the system and supplies the condensate to the solution when operation of the system is discontinued.

A further object is to provide an absorption refrigeration system including a dilution tank disposed at a pre-determined level and connected to a strong solution line, the height of the tank being so selected that the refrigerant head in the line connecting it to the strong solution line is substantially balanced by the solution head in the strong solution line during operation of the system. Other objects of my invention will be readily perceived from the following description.

This invention relates to an absorption refrigeration system comprising an evaporator, an absorber, a generator, and a condenser disposed in a closed circuit, a dilution tank, a line connecting the tank with the condenser shell whereby the tank receives vapor from the shell, the vapor being condensed in the tank by heat exchange relation with ambient atmosphere and a second line connecting the tank to the line between the ejector and the heat exchanger to supply condensate to the system when operation of the system is discontinued. The tank condenses vapor therein during initial operation of the system. The condensate from the tank is supplied to the system by forces of gravity when operation of the system is discontinued.

Figure 1:
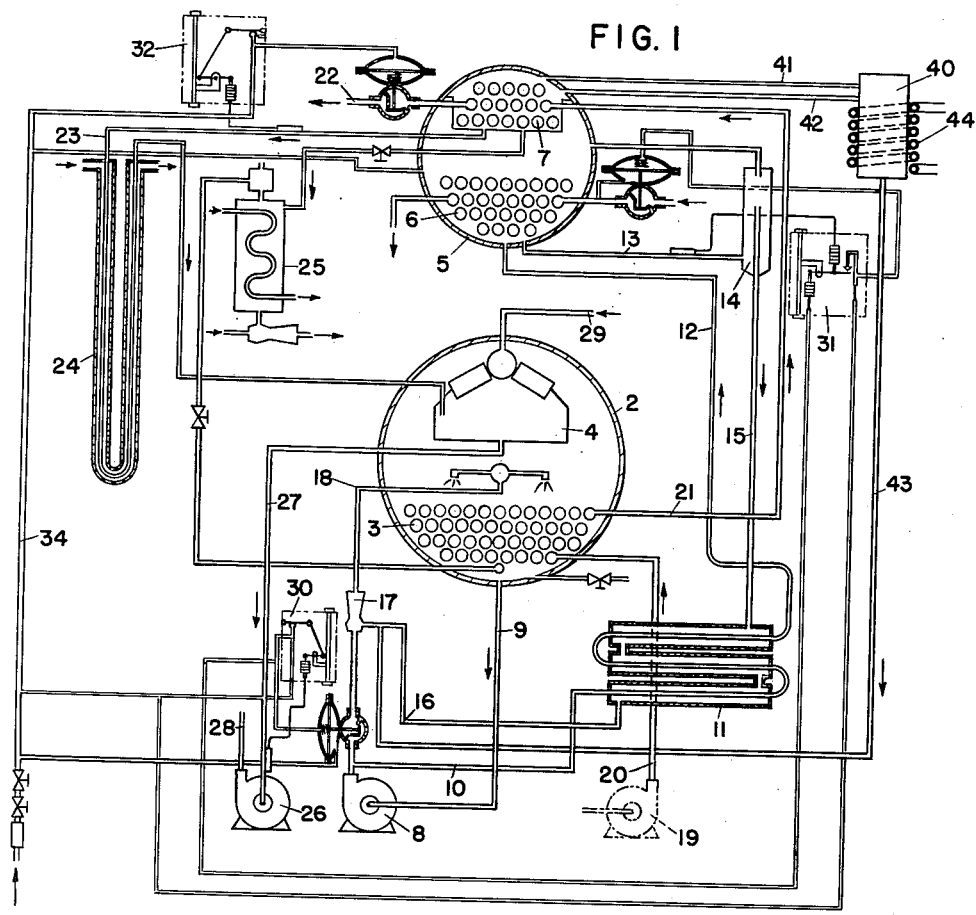
Figure 2:
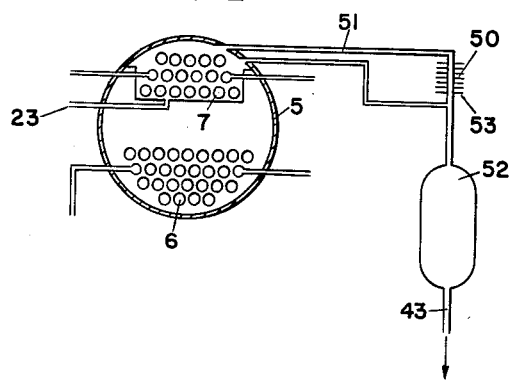

The attached drawing illustrates a preferred embodiment of the invention, in which Figure 1 is a diagrammatic view of an absorption refrigeration system including the solution diluting arrangement of the present invention; and Figure 2 is a fragmentary diagrammatic view illustrating a modification of the system shown in Figure 1.

Referring to the attached drawing, there is shown a shell 2 in which is placed a coil 3 which cooperates with the shell to form an absorber. A pan-like member 4 is placed in a shell 2 above coil 3 and cooperates with the shell to form an evaporator. A second shell 5 is placed above shell 2. A coil 6 is provided in shell 2 which cooperates therewith to form a generator or boiler. A second coil 7 is placed above generator 6 and cooperates with the shell to form a condenser. While various combinations of refrigerant and absorber may be employed, I prefer to employ a solution of water and lithium bromide as the absorber and water as the refrigerant.

Weak solution is drawn from absorber 3 by pump 8 through line 9 and is forwarded to generator 6 through line 10, heat exchanger 11 and line 12. Strong solution is withdrawn from generator 6 through line 13, overflow arrangement 14, line 15, heat exchanger 11, line 16 to ejector 17 which forwards strong solution through line 18 to absorber 3. A portion of the weak solution drawn from absorber 3 by pump 8 is forwarded to ejector 17. The discharge of the weak solution in ejector 17 entrains strong solution from line 16, the mixture being forwarded to absorber 3 through line 18. Overflow arrangement 14 prevents solution in generator 6 rising above or sinking below a predetermined level.

A pump 19 passes cooling water through line 20 to the coil of absorber 3 and then forwards the water after its passage through absorber 3 through line 21 to the coil of condenser 7, such water leaving condenser 7 through line 22.

A line 23 is used to withdraw refrigerant vapor condensate from condenser 7, the condensate passing through a pre-cooler 24 and then being returned to evaporator 4. A suitable purge arrangement 25 may be provided to purge condenser 7 and absorber 3 of non-condensible gases.

Chilled water treated by the system is withdrawn from evaporator 4 by pump 26 through line 27, is circulated through line 28 to an air-conditioning device (not shown) and is returned to the evaporator through line 29. The returned water is sprayed in evaporator 4, being flash-cooled. The flashed vapor passes downward, being absorbed by solution in absorber 3 while the chilled water is withdrawn from evaporator 4, as described above.

Suitable pneumatic controls, designated at 30, 31, 32 and 33, are provided to regulate operation of the system. Compressed air is supplied to the controls through main air line 34. The system and the controls therefor are illustrated and claimed in the co-pending applications of Alexis A. Berestneff, Serial Nos. 683,387 and 683,390, filed July 13, 1946, now Patents Nos. 2,565,943 and 2,565,838, granted August 28, 1951, and reference is made to such applications for a more complete description of the system and its controls.

The present invention is concerned primarily with mechanism permitting a desired amount of refrigerant to be withdrawn from circulation in the system when the machine is in initial operation and to permit the return of such refrigerant to the solution to dilute the same when operation of the system is discontinued thereby preventing crystallization of the solution or damage resulting from failure of the controls, electrical failure, failure of the pumps, etc.

For this purpose, I provide a dilution tank 40 connected to shell 2 by a vapor line 41 and a vent line 42 for non-condensible gases. Tank 40 is connected to line 16 by line 43. If desired, a cooling coil 44 may be placed about tank 40. It will be appreciated there is a substantial difference in the specific gravity of the solution and the refrigerant so that the location of tank 40 is of particular importance. Tank 40 should be so located that the water head in line 43 will be at least balanced out by the solution head in line 15. The pressure drop through heat exchanger 11 should also be considered. The desired level in tank 40 is normally maintained by the initial flow into line 43 of a certain amount of solution from line 16 which balances out the water head in line 43. In any event, tank 40 is placed at a level which permits it to meet the necessary requirements. Generally, when tank 40 is filled, a small amount of water corresponding to the amount of vapor condensed enters the system.

Considering the operation of the system at start-up, water vapor flows through line 41 connecting shell 5 to tank 40. Such vapor is condensed in tank 40 due to the removal of heat by ambient atmosphere which is normally cooler than the temperature of the condenser; if desired, cooling coil 44 may be supplied to assure condensation of such vapor. Tank 40 gradually fills with condensate thereby displacing the solution in line 43; after the desired refrigerant level has been attained, a small amount of condensate enters the system proportionately to the amount of vapor condensed during the operation. When it is desired to shut down the system, preferably, steam supply to the generator is discontinued while pump 8 continues in operation for a few minutes, circulating solution. Operation of the pump is then discontinued, solution level in line 15 falling after the pump is stopped; the head of the condensate in line 43 is then greater than the head of solution in line 15 so that condensate drains into the system until the heads of the condensate in line 43 and solution in line 15 are again substantially in balance. Due to the large difference in density between the water and the solution, a portion of the water which enters line 16 flows back into the heat exchanger, diluting the strong solution therein. A second portion flows into the ejector diluting the solution in the ejector and flows backward through the nozzle of the ejector and into the pump, thus diluting solution in such parts of the system.

The dilution action is speeded greatly by the substantial difference in density between the water and the solution. This permits ready mixing of the water into the solution by means of gravity with subsequent further mixing by diffusion over a period of time after operation of the machine has been discontinued.

While I have disclosed that line 43 connects tank 40 with line 16, it will be understood that if desired, line 43 may be connected to line 15 immediately before the heat exchanger. If desired, tank 40 may be placed in line 23, although such position of tank 40 is not as satisfactory as the position illustrated.

If desired, as shown in Figure 2, the refrigerant condensing and storage functions may be separated so that the refrigerant head may be adjustable over a wider range. As shown in Figure 2, line 51 connects the condenser shell 5 with a condensing member 50 which serves to condense the refrigerant vapor. Member 50 may comprise a portion of line 51 leading to a storage chamber 52 if desired. Such portion may be provided with fins 53 to enhance heat exchange between the vapor and the ambient atmosphere. Storage chamber 52 is connected by line 43 to line 16 as shown in Figure 1.

The present invention provides a simple automatic dilution arrangement which does not require any action on the part of the operator of the machine. It functions equally well whether the machine is shut down during normal operation or as a result of failure of any part of the system such as the solution pump. If desired, the line connecting the dilution tank and the system may be used to equalize the distribution of water between the strong solution in the heat exchanger and the rest of the system. The system provided may be readily installed on existing equipment and is economical in initial cost. The tank and connecting lines are so positioned that the refrigerant will mix with the absorbent by gravity upon shut-down.

While I have described a preferred embodiment of the invention, it will be understood that my invention is not limited thereto, since it may be otherwise embodied within the scope of the following claims.

I claim:

1. In an absorption refrigeration system, the combination of an absorber, an evaporator, a generator, and a condenser, a line connecting the absorber with the generator, a second line connecting the generator with the absorber, means for circulating solution through said lines, a dilution tank to receive refrigerant vapor from the generator to condense the same during initial operation of the system, said tank being placed at a level so selected that condensate head in a connecting line between the second line and the tank at least balances solution head in the second line during operation of the system, said tank discharging the condensate into the second solution line when operation of the system is discontinued.

2. In an absorption refrigeration system, the combination of an absorber, an evaporator, a generator, and a condenser disposed in a closed circuit, a solution pump, an ejector cooperating with the pump to supply strong solution from the generator to the absorber, a heat exchanger for placing strong and weak solutions in heat exchange relation, a dilution tank to receive refrigerant vapor from the generator to condense the same during initial operation of the system, said tank being connected to the strong solution line between the ejector and the heat exchanger and discharging the condensate into the strong solution line when operation of the system is discontinued.

3. An absorption refrigeration system according to claim 2 in which the tank is placed at a level so selected that condensate head in the connecting line at least balances solution head in the strong solution line during operation of the system.

4. An absorption refrigeration system according to claim 3 in which a vent line connects the tank with the condenser to permit withdrawal of non-condensible gases collecting in the tank.

5. In an absorption refrigeration system, the combination of a shell having a coil therein cooperating with the shell to form an absorber, a member in said shell above the coil cooperating with the shell to form an evaporator, a second shell having a coil therein cooperating therewith to form a generator, a second coil in said second shell cooperating therewith to form a condenser, a line connecting the absorber with the generator, a second line connecting the generator with the absorber, a solution pump, an ejector cooperating with the solution pump to forward strong solution from the generator to the absorber, said pump forwarding weak solution from the absorber to the generator, a dilution tank to receive refrigerant vapor from the generator to condense the same during initial operation of the system, a line connecting the tank with the strong solution line, the tank being placed at a level so selected that condensate head in the connecting line at least balances solution head in the strong solution line during operation of the system, said tank discharging the condensate into the system by forces of gravity when operation of the system is discontinued to provide mixing of refrigerant with solution and diffusion of refrigerant in the solution.

6. In an absorption refrigeration system the combination of an absorber, an evaporator, a generator and a condenser, a line connecting the absorber with the generator, a second line connecting a generator with the absorber, means for circulating solution through said lines, a storage tank, a third line connecting the storage tank with the generator to receive refrigerant vapor from the generator, at least a portion of said third line serving to condense vapor passing therethrough, the condensate passing to the storage chamber, said storage chamber discharging the condensate by forces of gravity into the strong solution line when operation of the system is discontinued.

References Cited in the file of this patent

UNITED STATES PATENTS

| Number | Name | Date |
|---|---|---|
| 2,337,439 | Anderson | Dec. 21, 1943 |
| 2,352,814 | Thomas | July 4, 1944 |
| 2,465,904 | McNeely | Mar. 29, 1949 |
| 2,525,011 | Anderson | Oct. 10, 1950 |
| 2,548,921 | Von Platen | Apr. 17, 1951 |
| 2,583,722 | Berestneff | Jan. 29, 1952 |